Patented Dec. 25, 1928.

1,696,338

UNITED STATES PATENT OFFICE.

HAROLD E. BIERCE, OF PASADENA, CALIFORNIA.

PROCESS OF DECOLORIZING VEGETABLE OILS.

No Drawing.   Application filed June 29, 1925.   Serial No. 40,458.

This invention relates to the treatment of vegetable oils, and particularly for the purpose of producing a clear oil substantially free from suspended solids or colloids and of a lighter color.

In the most commonly used process for producing a refined vegetable oil, the crude stock, which is usually of a very dark color due to the large percentage of suspended impurities and which also contains a comparatively high percentage of free fatty acid, is usually given a refining treatment with a solution of caustic soda or other similar alkaline solution. The alkaline solution is agitated with the crude oil for a certain period of time and a reaction takes place between the alkali and the free fatty acid with a resulting formation of what is known in the trade as "foots" or soap stock. When the formation, or coalescing of the particles of the foots has arrived at a certain point, the temperature of the oil is generally slightly raised so that the foots will easily settle to the bottom of the agitating vessel. After standing for a certain length of time, the foots gathers into a mass at the bottom and the oil is drawn off. At this point the oil is still partially permeated with very small particles of foots which have failed to settle and is in what may be termed a partially refined condition. At this time the oil is generally in a slightly alkaline condition due to the fact that a slight excess of caustic soda or other alkali was added in the refining process. It is now either pumped through a filter previously coated with some fast filtering agent, in order to take out the remaining suspended solids and excess alkalinity, or it is sprayed and agitated with water which, when settling to the bottom, will carry with it the small particles of foots and wash out the excess alkali. If the water wash is used, then it becomes necessary to dry the oil. Whether the filtration or water wash is used, the oil is now classed as a refined oil and must come up to certain specifications of the trade. It is therefore, a substantially neutral oil that is sufficiently clarified and decolorized to be useful for a large number of purposes, but which still contains a certain amount of color and suspended colloidal matter which must be removed in order to produce an oil suitable for other and well-known purposes, for example for edible purposes.

In the past these refined oils have been treated with varying amounts of bleaching earth or clay to remove the color to a point required by the trade, which is done by adding the proper amount of the bleaching earth or clay to the oil, bringing the oil up to a certain temperature which may vary within fairly wide limits and then pumping the oil with its burden of earth or clay through a filter, from which the oil emerges lightened in color and the earth or clay with its acquired impurities and coloring matter remains in the filter as what is known as filter cake. There have been many attempts to use an activated clay in this work in order to gain greater bleaching power but these activated clays have generally been found to be unsuitable because of the fact that the slight acidity remaining in them may cause an increase in the free fatty acid content of the oil, and because their use invariably causes what appears to be progressive decomposition to set in, causing the oil to gradually darken in color and to develop unpleasant taste and odor. This is particularly true and objectionable of the class of oils known as edible oils. Consequently, it has become general practice to use nothing but natural raw bleaching clays or earths which have not been subjected to any activation treatment. Even in the cases of raw earths and clays, the free fatty acid content of the oil is sometimes increased, a feature which is not desirable. This effect is generally attributed to selective adsorption on the part of the clay, the glycerol constituent of the fat or oil being adsorbed more readily, causing a small amount of free fatty acid to be liberated.

The process thus described is objectionable for the reason that the raw, natural earth or clay does not have a sufficient decolorizing or bleaching power and consequently large amounts thereof must be used. Its cost is not only in the cost of the clay or earth and the cost of the operation but lies also in the amount of oil that is retained by the clay or earth left in the filter. This retained oil is not recoverable, in commercial process, and is generally the largest cost of the bleaching operation. Clays or earths retain from twenty to forty per cent of their weight in oil, generally speaking, and this lost oil represents a very large figure. Consequently it is highly desirable to use a clay or earth in the smallest possible amounts consistent with obtaining the desired color result.

It is the general object of this invention to increase the bleaching power of any given amount of earth or clay or other decolorizing agent when such is used in the treatment of a vegetable oil, and particularly a refined oil, that is, an oil which is substantially free from fatty-acids, and thereby to make it possible to use less of the earth or clay to obtain the desired result; or, to obtain a lighter product than can be obtained under the present methods with any given amount of earth or clay. There are many cases of a refined vegetable oil which cannot be reduced in color to the proper point by the use of any amount of earth or clay when such is used in the present general practices. In such cases, as is well known in the art, it is a very difficult procedure to re-refine the oil and then follow with earth or clay treatment and one of the objects of my invention is to render possible the bleaching of such oils. Also it is the general object of this invention to make a raw, natural clay do the work of decolorizing or bleaching as well as, or better than, can be done with an activated clay under the present well-known practice; and to do this work without any of the bad or injurious results which usually follow the use of an activated clay on a vegetable oil.

In contra-distinction to the prior practice of decolorization above briefly described, my process is one that produces a product of similar color with less earth or clay, or a lighter product with the same amount of earth or clay; it produces an oil of the desired color and clarity with no increase in free fatty acid and with generally a decided decrease in free fatty acid, and the oil retained by the filter cake is less because to obtain any desired color result less earth or clay is required.

Speaking in a general way I accomplish these objects by subjecting the oil to treatment with a decolorizing earth or clay or other decolorizing agent while the oil is in an alkaline condition caused by addition of alkali thereto and while it contains unremoved products of such alkali treatment. Starting, for example, with an oil which has been refined by treatment with caustic soda as above described or otherwise, and from which the foots have been completely removed, leaving the oil in a substantially neutral condition, my method of treatment consists in first adding to such an oil sufficient caustic soda or other alkaline solution to neutralize any slight remaining acidity and render the oil alkaline, and then, without allowing the products of reaction to settle or be removed, and without any intermediate steps, treating the oil with the decolorizing earth or clay. The amount of alkaline solution used will vary somewhat but is essentially a small amount sufficient to neutralize remaining traces of free fatty acid and ensure alkalinity and the formation of some product of reaction such as a soap of one of the fatty acids in the oil, and such amount will vary with the character of the oil and with the quality of the earth or clay subsequently to be used. After addition of the alkaline solution to the oil the mixture is agitated, preferably at ordinary temperature or in a warm condition. The time of agitation is short, the exact time to obtain the best result depending upon the intensity of the agitation applied and other factors, such as the character of the oil, the amount of alkali used, etc. Generally speaking, a very small amount of the caustic soda or other alkaline solution added to a substantially neutral oil suffices to produce a condition of the oil more amenable to the bleaching action of the earth or clay to be used. Heat may be applied if desired during the agitation of the alkaline solution with the oil but I prefer in general to keep the temperature at this point close to room temperature.

In practice, I add the caustic soda or other alkaline solution, agitating the oil so that all the solution is broken up and comes in intimate contact with the oil. Then while keeping up the agitation and without allowing any products of reaction to settle I add the finely divided earth or clay to the oil in an amount which will, of course, depend upon the degree of decolorization required. The agitation is now continued and the temperature is raised to a suitable point depending upon the nature of the oil being treated and the kind of product desired. When the temperature is raised to this point, the agitation should be continued for a short time to obtain the highest efficiency of the clay or earth. I then filter off the clay or earth with its accompanying adsorbed impurities and coloring matter and the resulting filtered oil is the finished product. The alkaline solution has substantially removed any remaining traces of free fatty-acid and further prevented the development of free fatty acid in the oil and has produced a condition which very greatly enhances the decolorizing ability of the clay or earth.

The conditions of temperature and time of heating and agitating the clay or earth with the alkaline oil, and the temperature at which the filtration is carried out, may follow in general the conditions ordinarily used in the treatment of any particular oil with bleaching clay or earth; or in some cases some of these conditions may be varied slightly from standard practice. For example a somewhat lower temperature or a somewhat shorter time of contact may in some cases be employed with advantageous results. The proportion of earth or clay used may be substantially the same as in standard practice, in which case the bleaching effect is materially increased. The aim is in many cases, however, to obtain the same bleaching effect as has heretofore been produced, and in such cases the proportion of earth or clay required is considerably less than ordinarily used with present methods.

As an example of one particular method of carrying out my process on a certain refined and substantially neutral oil the following may be given, but it should be understood that the exact conditions of proportion of alkali added, proportion of clay used, or time and temperature of heating and agitating, as given below, may be departed from quite widely in the case of other oils, and need not be adhered to in every case even with the same kind of oil. To cottonseed oil, after refining with caustic soda in the usual manner and removing the "foots" above described, is added about one half per cent by weight of 18° Bé. solution of caustic soda, the mixture being thoroughly agitated for about five minutes. While continuing the agitation a suitable decolorizing clay or earth is added in the proportion of about two per cent to six per cent by weight. The temperature is then raised to about 220° F. and the agitation continued for about five minutes at this temperature. At the end of this time the mixture is subjected to filtration in an ordinary filter press of any suitable type and the filtrate obtained is a substantially neutral oil of excellent color, taste, and odor. The oil thus produced has a lower free fatty acid content and a lighter color than that obtained by treatment with a similar amount, or with any reasonable amount, of similar clay or earth in the usual manner, that is in the absence of the alkaline condition. For example, a sample of refined oil treated in the manner, using one half per cent of caustic soda solution and four per cent of a decolorizing earth known as "western clay" and mined by the Western Clay and Metals Company at its deposit near Aurora, Utah, had a color of 20 yellow and 1.8 red, while a sample of the same oil treated under parallel conditions of temperature and agitation, but without addition of alkali and with six per cent of the same earth, had a color of 30 yellow and 3.0 red, showing that by my process a much greater decolorization may be obtained with 4% of this earth than is obtained in the customary method with 6% of the same earth.

Any of the various forms of fuller's earth or decolorizing clays may be used in my process. Such clays are well-known to the trade and although the chief object and the chief accomplishment of the invention is the increased power of these raw, natural finely divided clays or earths, an activated clay may be used in the process with similar results of increased efficiency. My process produces a higher degree of decolorization by use of raw clay or earth than can be obtained on the average in any of the known methods with an equal amount of any activated clay of which I am aware, and the greatest economy, therefore, is obtained by using a raw clay. However, my particular procedure will substantially increase the efficiency of an activated clay if that clay be used in the manner herein described. And it will largely offset the injurious results obtained from the use of an activated clay used in the known methods. The expression "decolorizing earth" or "adsorbent earth" as used herein is therefore understood to include any of the above mentioned decolorizing or bleaching clays or earths, whether raw or activated, or any other mineral or earthy material capable of acting as an adsorbent or decolorizing medium. Instead of adsorbent clay or earth, other decolorizing mediums may be used in connection with my process, such as decolorizing carbons, etc., and the invention should therefore be understood as including the treatment of a vegetable oil, while in alkaline condition, with any solid decolorizing agent or finely divided adsorbent material.

Since by my process a smaller proportion of clay or earth may be used to produce the same results than by the ordinary methods, the proportion of filter cake and consequently the loss of oil due to retention in such filter cake is materially reduced. This process therefore reduces the cost of decolorizing not only by reducing the consumption of clay or earth but also by decreasing the loss of oil.

I have described my process typically as including first the usual caustic soda refining treatment, or as operating upon an oil which has been so refined. However, my specific process of clay or earth application to an oil which has been subjected to a slight treatment with caustic soda or similar alkaline solution to render the same slightly alkaline without settlement and withdrawal of the products of reaction, may be carried out directly upon any oil which is sufficiently low in fatty-acid content to be classed as a substantially neutral or fatty-acid free oil.

My invention may be applied in connection with any vegetable oil, such as for example cottonseed oil, soya bean oil, or cocoanut oil.

I claim:

1. In the process of clarifying and decolorizing refined and substantially neutral vegetable oils, the steps which comprise adding sufficient alkaline solution to such an oil to render the same slightly alkaline, and then, before removal of the alkali and products of reaction thereof, subjecting the oil to the action of an adsorbent earth.

2. The herein described process of clarifying and decolorizing a refined and substantially neutral vegetable oil, consisting in adding sufficient alkaline solution thereto, to render it slightly alkaline, mixing adsorbent earth with the oil before removal of the alkali and reaction products of the alkali on the oil, and then filtering the earth with its accompanying gathered impurities from the oil.

In testimony whereof I have hereunto subscribed my name this 20th day of June, 1925.

HAROLD E. BIERCE.